(12) United States Patent
Arulf

(10) Patent No.: US 6,648,543 B2
(45) Date of Patent: Nov. 18, 2003

(54) DEVICE FOR A SPACE VESSEL

(75) Inventor: Örjan Arulf, Linköping (SE)

(73) Assignee: Saab Ericsson Space AB, Göteborg (SE)

( * ) Notice: Subject to any disclaimer, the term of this patent is extended or adjusted under 35 U.S.C. 154(b) by 0 days.

(21) Appl. No.: 10/125,561

(22) Filed: Apr. 19, 2002

(65) Prior Publication Data

US 2003/0198512 A1 Oct. 23, 2003

(30) Foreign Application Priority Data

Apr. 19, 2001 (SE) .............................. 0101398

(51) Int. Cl.7 .................................................. B64G 1/62
(52) U.S. Cl. ...................................... 403/334; 244/161
(58) Field of Search ............................... 244/161, 131; 403/333, 334

(56) References Cited

U.S. PATENT DOCUMENTS

| | | | | |
|---|---|---|---|---|
| 4,715,565 A | * | 12/1987 | Wittmann | ............... 244/131 X |
| 5,352,061 A | * | 10/1994 | Robinson | ............... 244/161 X |
| 5,649,680 A | | 7/1997 | Andersson | |
| 6,290,182 B1 | | 9/2001 | Grunditz | |
| 6,494,407 B2 | * | 12/2002 | Arulf | ........................ 244/161 |

FOREIGN PATENT DOCUMENTS

| | | |
|---|---|---|
| FR | 2794102 | 2/2000 |
| SE | 511 762 | 3/1999 |

* cited by examiner

*Primary Examiner*—John R. Cottingham
(74) *Attorney, Agent, or Firm*—Swidler Berlin Shereff Friedman, LLP

(57) ABSTRACT

A flange (1) for a space vessel (2), which flange (1) is arranged so as to reduce a shock or impact wave that occurs upon the release of a coupling (5). The coupling (5) is intended to impart a radially inwardly acting force to hold together two separable space vessel parts (3, 4) via two flanges (1, 6) belonging to respective space vessel parts (3, 4). The first flange (1) comprises at least one weakened point (9) so that it has a substantially broken annular shape, in order to thus reduce its energy-absorbing capacity when it is bent inward by the force (F).

19 Claims, 1 Drawing Sheet

DEVICE FOR A SPACE VESSEL

TECHNICAL AREA

This invention concerns a device for a space vessel for reducing a shock or impact wave that occurs upon the release of a coupling that is arranged so as to hold together a first vessel part and a second vessel part that is separable from the first vessel part. The coupling is intended to hold these parts together preferably during the launch of the space vessel. The invention is intended more specifically to reduce the impact and/or shock effect from the release of a coupling that includes a number of clips that are pressed by means of a surrounding band against flanges on the separate parts and hold them together.

BACKGROUND AND PROBLEM OF THE INVENTION

Coupling devices for holding together, without substantial mutual movement, parts of a space vessel such as a booster rocket and a satellite constitute important structural components for absorbing the forces that act between said parts during the launch of a space vessel.

These coupling devices must maintain low weight, and must be designed for extremely high reliability in view of the very high launching costs, while it is at the same time impossible to rectify any errors that may arise once the vessel has left the ground. Low weight is especially important in the satellite part of the space vessel.

When the parts are to be separated, the coupling is released, which means that its radially inwardly directed forces disappear. This results in the occurrence of an impact and/or shock wave in those parts of the space vessel on which the coupling had been acting. This impact/shock wave is usually on the order of 3000–4000 g and ranges from 1000 Hz and upward, and it propagates via the parts of the space vessel and thus affects the space vessel and/or parts integrated therewith, such as impact- or shock-wave-sensitive electronics components or other parts.

OBJECT OF THE INVENTION AND SOLUTION OF THE PROBLEM

The object of the invention is to solve one or more of the foregoing problems. This is achieved using a device as described herein.

The radially active forces of the coupling are transferred to other parts of the space vessel by way of a weakened point in one of the parts of the space vessel on which the coupling is intended to act. A radial stop is arranged on the second space vessel part and is intended to transfer additional portions of the radial force from the coupling via a notch in the first flange on the first space vessel part to the second space vessel part. The weakened point thus decreases the energy stored in the first part and obtained from the force produced by the coupling. The attenuated part can thus bend aside and permit the second flange to absorb the force and thus store the bulk of the energy.

Additional preferred embodiments of the invention are also described below.

DESCRIPTION OF THE DRAWINGS

The invention will be described in greater detail in exemplary embodiments with reference to the figures, as follows.

DESCRIPTION OF EMBODIMENTS

Figure 1:
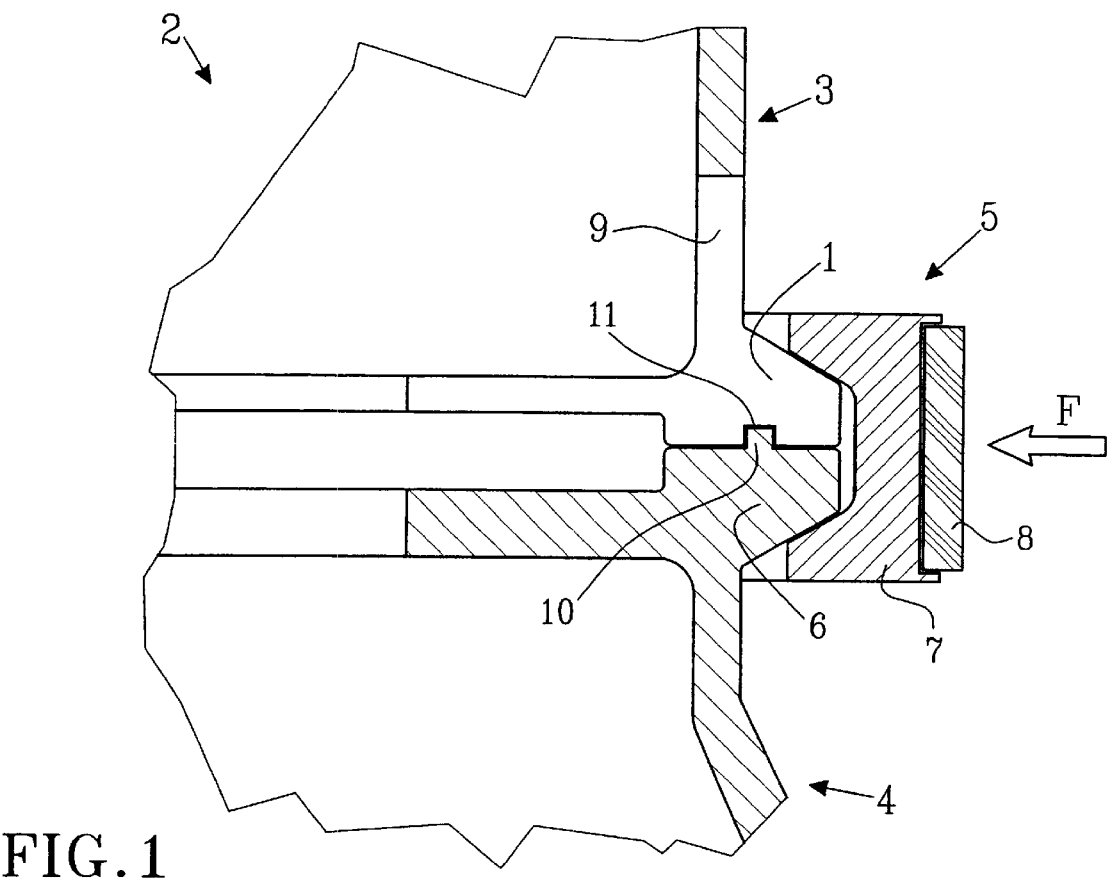
FIG. 1 shows a sectioned schematic diagram of a device according to the invention and a coupling exemplified by a clamp coupling for two separable parts of a space vessel.
Figure 2:
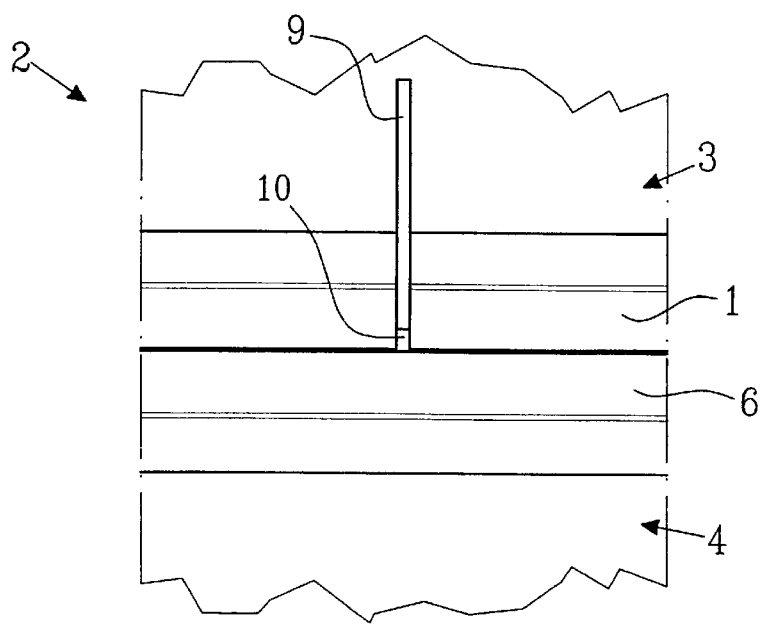
FIG. 2 shows a schematic diagram as per FIG. 1 in the radial direction and without the clamp coupling.

A first flange is designated in the drawing as 1, and a space vessel is designated as 2. The space vessel 2 includes two mutually separable parts 3, 4, e.g. a satellite part 3 placed on a booster rocket, 4, the "launcher part." A coupling 5 is arranged so as to hold the two parts 3, 4 together during that portion of the time in which the coupling 5 is in use.

The coupling 5 comprises the first flange 1 fixedly mounted on a lower portion of the first space vessel part 3 and a second flange 6 fixedly mounted on an upper portion of the second space vessel part 4. The coupling 5 further comprises one or more clips 7 distributed about the periphery of the flanges 1, 6 and a tensioning element 8 that runs around or through the clips 7 and pushes them radially inward against the flanges 1, 6. The clips 7 are thus arranged so as to convert a radial force from the tensioning element 8 into a clamping force and clamp the flanges 1, 6 against one another. The inward radial force of the tensioning element 8 is opposed outwardly by the flanges 1, 6 plus the parts of the space vessel 2 in abutment thereto. In an alternative embodiment the clips 7 and the tensioning element 8 are a unit.

The flange 6 is substantially annular and runs about the space vessel 2. This means that it has a highcapacity for absorbing, without substantially bending inward toward the space vessel 2, the radially inwardly directed force from the tensioning element 8. Both the flanges 1, 6 extend radially out from the respective space vessel parts 3, 4. In a preferred embodiment the respective flanges 1, 6 also extend radially inward from the walls of the respective vessel parts 3, 4.

A number of weakened points 9 are realized in a preferred embodiment as one or more slits 9 in the first flange 1, so that its annular shape is completely or partially broken. In alternative embodiments the weakened points 9 can be realized as, e.g. holes or perforations. The weakened points 9 thus differentiate a first area on one side of the weakened point from a second area on the other side of the weakened point 9, so that the areas can at least partly move and/or bend in mutual independence, and in directions both along the circumference and/or radially. In a preferred embodiment with a plurality of weakened points 9 in the flange 1, the flange 1 consists of a number of segments that can move closer to one another when radially and inwardly loaded. Because the stored energy in any of the flanges 1, 6 can be expressed as a force multiplied by a distance, this means that when the flange 1 is bent or displaced inwardly when loaded, it can thus store less energy than the second flange 6 can from the same inward bending or displacement. FIG. 1 also shows a slit 9 that extends through the flange 1 and a section along the wall of the first space vessel part 3, which section further reduces the energy-storing capacity of the flange 1 and thus of the abutting portion of the first space vessel part 3. The energy-absorbing capacity thus decreases with the extent of the slit 9 in the direction of travel of the space vessel 2. The number of slits 9 is preferably more than three, but the energy-absorbing capacity of the first flange 1 will be reduced for a predetermined inward bend even if only one slit 9 is present. A larger number of slits 9 will distribute the forces more uniformly over the first flange 1. The widths of the slits 9 are preferably realized at ca. 0.3–5 mm, which is advantageous from a production engineering standpoint, but they can also be wider. However, the width should be great enough that the slit 9 does not close when bent inward, since that would increase the energy-absorbing capacity.

The weakened point 9 can be covered or partially filled out with soft and/or resilient material, which will not substantially impede or affect the movement or bendability of the attenuated flange 1.

A radial stop 10 is realized on the second flange 6. A corresponding notch 11 is present in the first flange 1. When the radial stop 10 is fit into the notch 11, the inwardly directed bending of the first flange 1 as a result of the radial force will be limited so that yet another portion of the radial forces acting on the first flange 1 will be absorbed by the radial stop 10, and thus by the second flange 6. The first flange 1 can thus, when loaded by the tensioning element 8, be displaced inwardly for the distance permitted by the potential play between the radial stop 10 and the notch 1, as necessitated based on production- and/or assembly engineering factors, and further displaced the additional distance that the second flange 6 is potentially bent/displaced inward by the tensioning element 8.

In alternative embodiments the weakened points 9 are realized by means of a combination of slits and, for example, thinning of the material or one or more drill holes. The radial stop can also comprise alternative embodiments, e.g. the radial stop can be realized on the first flange 1 while the notch is realized in the second flange 6, or the radial stop can comprise a plurality of projections with corresponding notches in the first flange 1, while other embodiments with shape-based engagement capacity are also possible.

The invention must not be viewed as being limited to the foregoing exemplary embodiments, and is capable of variation.

List of Reference Numbers 1 first flange
2 space vessel
3 first space vessel part
4 second space vessel part
5 coupling
6 second flange
7 clip
8 tensioning element
9 slit
10 radial stop
11 notch
F Radial force

What is claimed is:

1. A device for a space vessel, comprising:
   a first flange interconnected with a first space vessel part, the first flange comprising at least one weakened point so that it has a substantially broken annular shape whereupon the energy-absorbing capacity of the flange is reduced;
   a second flange interconnected with a second space vessel part, wherein the second flange is substantially annular with a higher capacity for absorbing the radially inwardly directed force than the first flange; and
   an annular coupling operative to engage the first flange and the second flange and to impart a radially inwardly acting force to hold together the first space vessel part and the second space vessel part that is separable from the first space vessel part.

2. The device according to claim 1, further comprising:
   at least one notch in the first flange; and
   at least one radial stop in the second flange, wherein under a radial load from the annular coupling the at least one notch engages the at least one radial stop.

3. The device according to claim 1, wherein at least one weakened point comprises a slit that breaks the annular shape of the first flange and extends a distance into the wall of the first space vessel part.

4. The device according to claim 3, wherein the at least one a weakened point extends substantially in a direction of travel of the space vessel.

5. The device according to claim 1, wherein the at least one a weakened point extends substantially in a direction of travel of the space vessel.

6. The device according to claim 1, wherein the first flange comprises two weakened points in at least two places along the annular shape of the first flange.

7. The device according to claim 1, wherein the first flange comprises a plurality of weakened points.

8. The device according to claim 1, wherein the first space vessel part comprises a satellite.

9. The device according to claim 1, wherein the second space vessel part comprises a rocket.

10. The device according to claim 1, wherein the first flange, the second flange and the annular coupling comprise a unit.

11. The device according to claim 1, wherein the at least one weakness in the first flange makes the first flange able to store less energy than the second flange from a similar inward bending force.

12. The device according to claim 1, wherein at least one weakened point comprises a slit that breaks the annular shape of the first flange.

13. The device according to claim 12, further comprising:
   material that is at least one of soft and resilient arranged in the slit.

14. The device according to claim 13, wherein the material covers the slit.

15. The device according to claim 13, wherein the material partially fills the slit.

16. The device according to claim 1, wherein the at least one weakened point comprises a slit and a thinning of the first flange.

17. The device according to claim 1, wherein the at least one weakened point comprises a slit and at least one drill hole in the first flange.

18. The device according to claim 1, further comprising:
   at least one notch in the second flange; and
   at least one radial stop in the first flange, wherein under a radial load from the annular coupling the at least one notch engages the at least one radial stop.

19. A space vessel, comprising:
   a first space vessel part;
   a second space vessel part that is separable from the first space vessel part;
   a first flange interconnected with the first space vessel part, the first flange comprising at least one weakened point so that it has a substantially broken annular shape whereupon the energy-absorbing capacity of the flange is reduced;
   a second flange interconnected with the second space vessel part, wherein the second flange is substantially annular with a higher capacity for absorbing the radially inwardly directed force than the first flange; and
   an annular coupling operative to engage the first flange and the second flange and to impart a radially inwardly acting force to hold together the first space vessel part and the second space vessel part.

* * * * *